United States Patent
Terasawa et al.

(10) Patent No.: US 12,530,930 B2
(45) Date of Patent: Jan. 20, 2026

(54) METHOD OF MANAGING POWER STORAGE AND POWER STORAGE MANAGEMENT SYSTEM, AND COMPUTER APPARATUS AND VEHICLE

(71) Applicant: TOYOTA JIDOSHA KABUSHIKI KAISHA, Toyota (JP)

(72) Inventors: Yuko Terasawa, Tokyo-to (JP); Makoto Kakuchi, Toyota (JP); Toshiaki Karasawa, Tokyo-to (JP); Takeshi Higashi, Nagoya (JP); Yoshihiko Endo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/535,056

(22) Filed: Dec. 11, 2023

(65) Prior Publication Data
US 2024/0233457 A1    Jul. 11, 2024

(30) Foreign Application Priority Data

Jan. 11, 2023 (JP) ................................. 2023-002525

(51) Int. Cl.
G07C 5/00 (2006.01)
B60S 5/06 (2019.01)
G06Q 30/0645 (2023.01)

(52) U.S. Cl.
CPC ......... G07C 5/008 (2013.01); G06Q 30/0645 (2013.01); B60S 5/06 (2013.01)

(58) Field of Classification Search
CPC . G07C 5/008; B60L 58/10; B60L 3/00; B60S 5/06; G06Q 30/0645
USPC .......................................................... 701/31.4
See application file for complete search history.

(56) References Cited

U.S. PATENT DOCUMENTS

| | | | |
|---|---|---|---|
| 2013/0106594 A1* | 5/2013 | Hiramatsu | H02J 9/002 340/436 |
| 2020/0262495 A1 | 8/2020 | Asai | |
| 2020/0313249 A1* | 10/2020 | Zhao | H01M 10/4257 |
| 2022/0111812 A1* | 4/2022 | Murakami | B60L 58/10 |
| 2024/0029480 A1* | 1/2024 | Huang | B60W 50/0205 |

FOREIGN PATENT DOCUMENTS

JP 2020-135311 A 8/2020

\* cited by examiner

*Primary Examiner* — Helal A Algahaim
*Assistant Examiner* — John D Holman
(74) *Attorney, Agent, or Firm* — Sughrue Mion, PLLC

(57) ABSTRACT

A method of managing a power storage includes determining, when break of a body of a vehicle including a leased power storage is sensed, whether or not the power storage is in a controllable state, setting an output limit of the power storage in the vehicle when it is determined that the power storage is in the controllable state, and transmitting a collection request signal that requests collection of the power storage from the vehicle to a terminal of an owner of the power storage when break of the body is sensed.

14 Claims, 6 Drawing Sheets

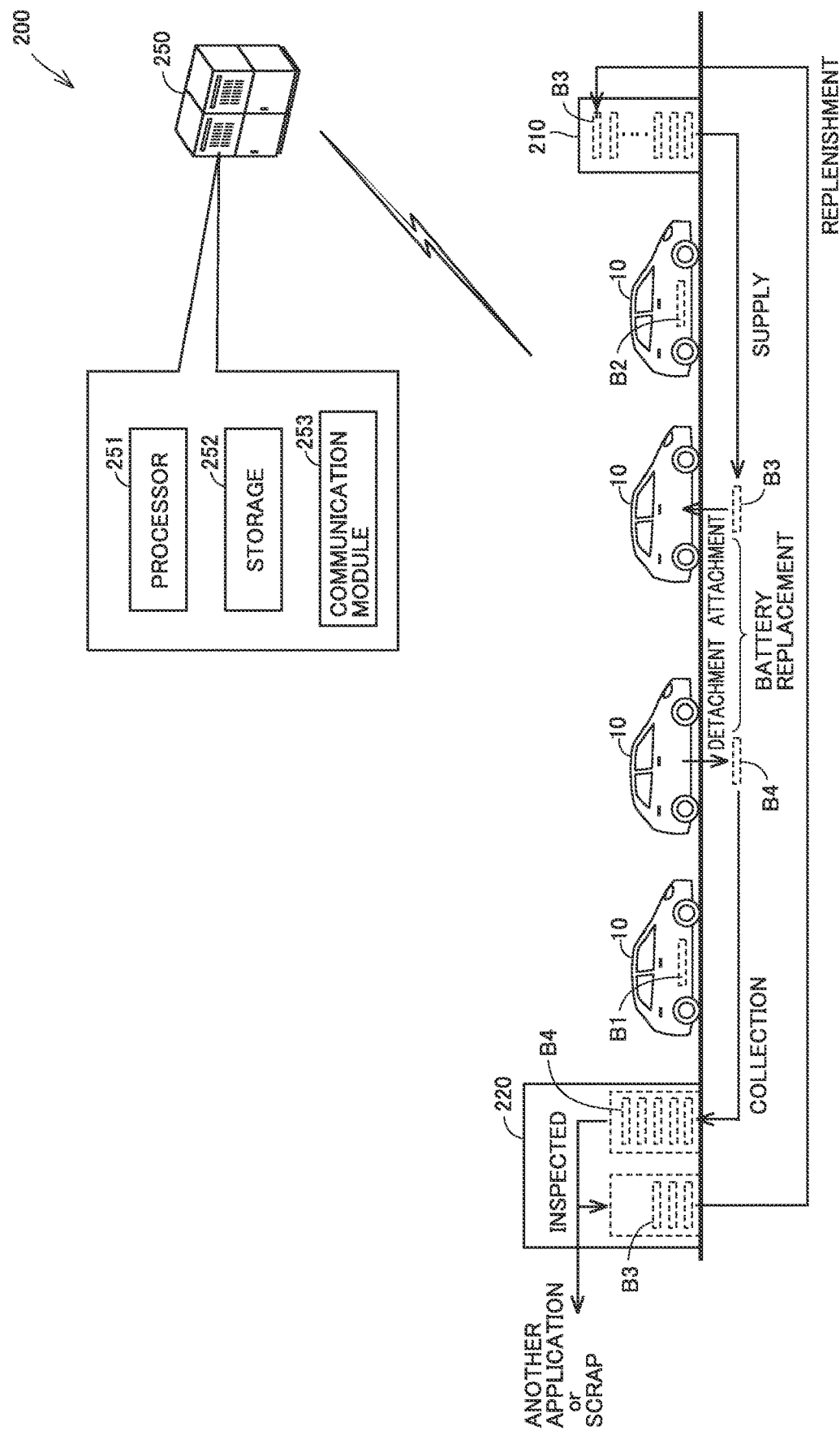

METHOD OF MANAGING POWER STORAGE AND POWER STORAGE MANAGEMENT SYSTEM, AND COMPUTER APPARATUS AND VEHICLE

CROSS REFERENCE TO RELATED APPLICATIONS

This nonprovisional application is based on Japanese Patent Application No. 2023-002525 filed with the Japan Patent Office on Jan. 11, 2023, the entire contents of which are hereby incorporated by reference.

BACKGROUND

Field

The present disclosure relates to a method of managing a power storage and a power storage management system, and a computer apparatus and a vehicle.

Description of the Background Art

Japanese Patent Laying-Open No. 2020-135311 discloses a technique for specifying a driver of a vehicle at the time of detection of possibility of break of the vehicle based on information on the driver of the vehicle. Such a technique is applied, for example, to a vehicle sharing system.

SUMMARY OF THE DISCLOSURE

Vehicles have recently been electrified worldwide, and technologies in four fields called "CASE" (connected, autonomous, shared, and electric) have particularly attracted attention. A vehicle lease service (including a vehicle sharing service) currently widely available is a service to lease a whole vehicle. In the future, however, a service to lease a vehicle power storage alone rather than the whole vehicle may widely be available.

The user who receives the service can use with low cost, an electrically powered vehicle owned by the user himself/herself by mounting a leased power storage on a body of the electrically powered vehicle. When the body of such an electrically powered vehicle is broken, for example, in an accident, however, the power storage may be collected together with the body and disposed of. According to the technique described in Japanese Patent Laying-Open No. 2020-135311, the driver of the vehicle may be specified when the vehicle is broken, whereas an owner of the power storage is not specified. The owner of the power storage is unable to know break of the vehicle. Therefore, it is difficult for the owner of the power storage to collect the power storage from the vehicle in the event of break of the body.

The present disclosure was made to solve the problem above, and an object thereof is to facilitate collection from a vehicle including a leased power storage by an owner of the power storage, of the power storage when a body of the vehicle is broken.

According to a form according to a first point of view of the present disclosure, a method of managing a power storage shown below is provided.

(Clause 1) The method of managing a power storage includes processes A to C. In process A, when break of a body of a vehicle including a leased power storage is sensed, whether or not the power storage is in a controllable state is determined. In process B, when it is determined that the power storage is in the controllable state, an output limit of the power storage is set in the vehicle. In process C, when break of the body is sensed, a collection request signal that requests collection of the power storage from the vehicle is transmitted to a terminal of an owner of the power storage.

In the management method, when break of the body (for example, a body shell) is sensed, a terminal of the owner of the power storage is requested to collect the power storage from the vehicle. With the collection request signal, collection of the power storage from the vehicle by the owner of the power storage is facilitated. When the power storage is in the controllable state, the output limit of the power storage is set in the vehicle. As use of the power storage is thus limited, unauthorized use of the vehicle with another power storage being mounted on a repaired body before collection of the power storage by the owner of the power storage is suppressed. Collection of the power storage from the vehicle by the owner of the power storage is thus facilitated.

The terminal of the owner of the power storage may be a stationary computer (for example, a server) or a terminal (for example, a smartphone) carried by the owner of the power storage.

The method of managing a power storage according to Clause 1 may be configured according to any one of Clauses 2 to 4 shown below.

(Clause 2) The method of managing a power storage according to Clause 1 further includes a feature below. The method further includes canceling the output limit set in the vehicle when the power storage is collected by the owner of the power storage from the vehicle in which the output limit is set.

According to the method, after the owner of the power storage collects the power storage, a vehicle user can use the vehicle with another power storage being mounted on the repaired body.

(Clause 3) The method of managing a power storage according to Clause 1 or 2 further includes a feature below. The method further includes processes D and E. In process D, whether or not the vehicle has been involved in an accident is determined. In process E, when it is determined that the vehicle has been involved in the accident, whether or not the body has been broken is determined. Process E includes processes E-1 and E-2. In process E-1, when the body is damaged to such an extent that the vehicle is unable to continue traveling, it is determined that the body has been broken. In process E-2, when the body is not damaged to such an extent that the vehicle is unable to continue traveling, it is determined that the body has not been broken.

According to the method, when the vehicle is unable to continue traveling, the terminal of the owner of the power storage is requested to collect the power storage from the vehicle. Collection of the power storage from the vehicle by the owner of the power storage is thus facilitated. The state in which the vehicle is unable to continue traveling includes not only a state in which the vehicle is totally unable to travel but also a state in which the vehicle is unable to continue ordinary traveling (traveling other than limp home traveling) although it is capable of limp home traveling.

(Clause 4) The method of managing a power storage according to Clause 3 further includes a feature below. The method further includes transmitting a replacement request signal that requests permission of replacement of the power storage mounted on the vehicle to the terminal of the owner of the power storage when it is determined that the vehicle has been involved in the accident and that the body has not been broken.

According to the method, when the vehicle is able to continue traveling, the vehicle can continue traveling to a location of replacement of the power storage and can have the power storage replaced. The owner of the power storage can collect the power storage from the vehicle by permitting replacement of the power storage at a prescribed location.

According to one form, a program that causes a computer to perform the method of managing a power storage according to any one of Clauses 1 to 4 is provided. In another form, a computer apparatus that distributes the program is provided.

According to a form according to a second point of view of the present disclosure, a computer apparatus shown below is provided.

(Clause 5) The computer apparatus includes a processor and a storage where a program causing the processor to perform the method of managing a power storage according to any one of Clauses 1 to 4 is stored.

According to the computer apparatus, the method of managing a power storage described previously is suitably performed.

According to a form according to a third point of view of the present disclosure, a power storage management system shown below is provided.

(Clause 6) The power storage management system includes the vehicle including the computer apparatus according to Clause 5 and a server that provides a lease service for lease of a power storage to the vehicle. The storage of the computer apparatus further stores owner information indicating that the terminal of the owner of the power storage mounted on the vehicle is the server. The computer apparatus is configured to set an output limit of the power storage in the vehicle and to transmit the collection request signal to the server when break of the body is sensed and it is determined that the power storage is in a controllable state.

According to the configuration, when the body of the vehicle including the power storage leased by the lease service is broken, the computer apparatus mounted on the vehicle can request the server that provides the lease service to collect the power storage with the use of the owner information stored in the storage.

The power storage management system according to Clause 6 may be configured according to Clause 7 shown below.

(Clause 7) The management system according to Clause 6 further includes a plurality of replacement stations where the power storage for the vehicle is replaced. The computer apparatus is configured to transmit to the server, a replacement request signal that requests permission of replacement of the power storage mounted on the vehicle. When the server receives the replacement request signal, the server requests a replacement station to secure a power storage that replaces the power storage mounted on the vehicle.

According to the system, when replacement of the power storage mounted on the vehicle is necessitated, the replacement station more readily prepares the power storage for replacement early.

According to a form according to a fourth point of view of the present disclosure, a vehicle shown below is provided.

(Clause 8) The vehicle is configured to perform the method of managing a power storage according to any one of Clause 1 to 4. The vehicle includes a body, a power storage mounted on the body, a sensor that senses break of the body, a first controller that performs the method for the power storage, and a second controller that controls the power storage. The first controller is configured to determine whether the body has been broken, based on a result of sensing by the sensor. The second controller is configured to determine whether the power storage is in the controllable state when it is determined that the body has been broken. The first controller is configured to set an output limit of the power storage in the second controller when it is determined that the power storage is in the controllable state.

According to the vehicle, the method of managing a power storage described previously is suitably performed.

The vehicle including the power storage may be an electrically powered vehicle (xEV) that uses electric power as the entirety or a part of a motive power source. Examples of the xEV include a battery electric vehicle (BEV), a hybrid electric vehicle (HEV), a plug-in hybrid electric vehicle (PHEV), and a fuel cell electric vehicle (FCEV).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a diagram for illustrating a configuration and an operation of the replacement station included in the power storage management system according to the embodiment of the present disclosure.

DESCRIPTION OF THE PREFERRED EMBODIMENTS

Figure 1:
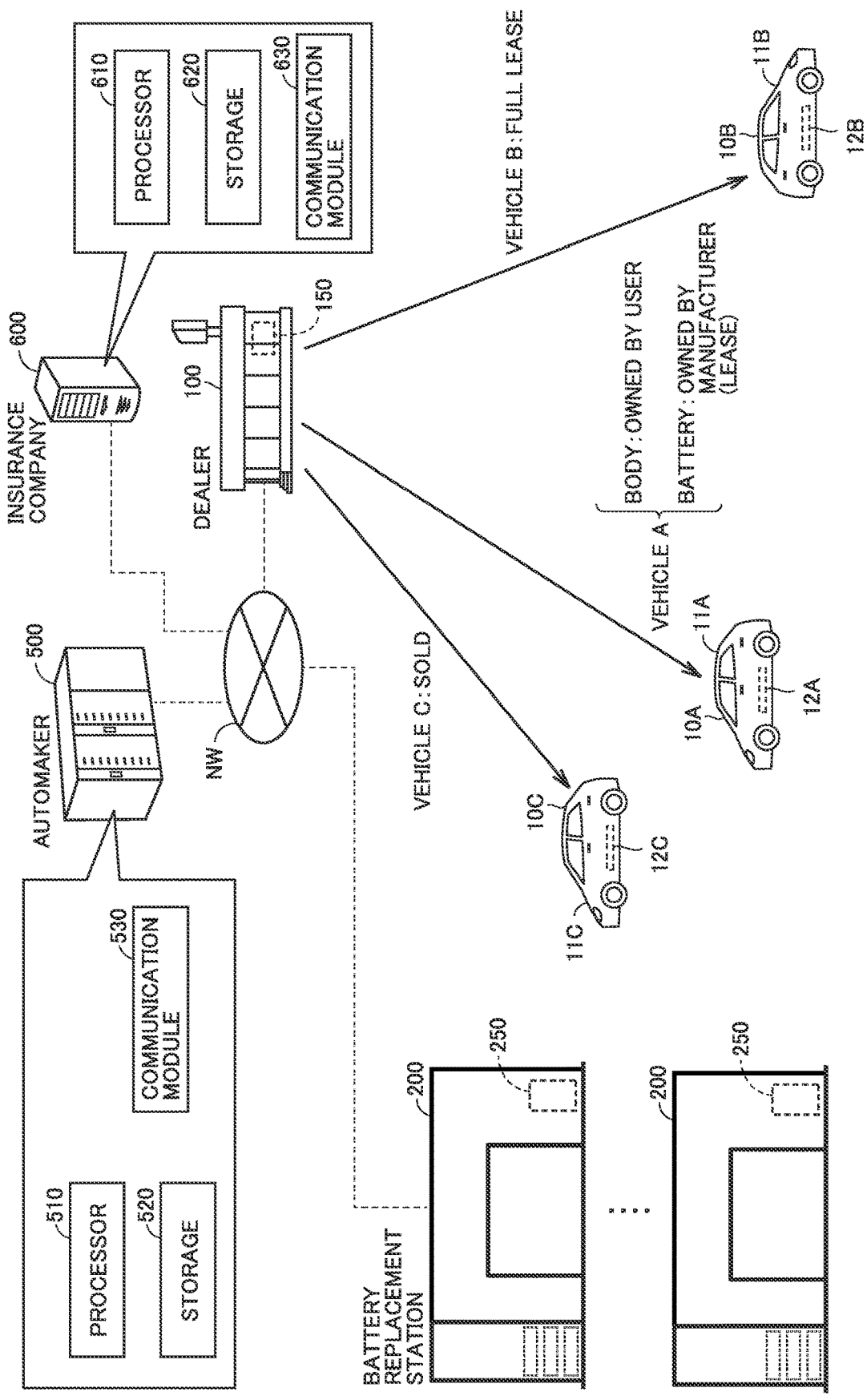
FIG. 1 is a diagram for illustrating overview of a power storage management system according to an embodiment of the present disclosure.

An embodiment of the present disclosure will be described in detail with reference to the drawings. The same or corresponding elements in the drawings have the same reference characters allotted and description thereof will not be repeated.

FIG. 1 is a diagram for illustrating overview of a power storage management system according to this embodiment. The management system shown in FIG. 1 includes a dealer 100, a battery replacement station (which is denoted as "BSta" below) 200, a management center 500, and an insurance server 600.

Management center 500 is a server that provides a lease service for lease of a power storage for a vehicle (for example, for an xEV). Management center 500 manages information on the lease service. Management center 500 belongs, for example, to an automaker. In this embodiment, the automaker also serves as a leasing company. Insurance server 600 is a server that provides an insurance service relating to a damage to the power storage for the vehicle (for example, for the xEV). This insurance service is a service for compensation for a damage to the power storage mounted on the vehicle. Insurance server 600 manages information on the insurance service. Insurance server 600 belongs, for example, to an insurance company. Insurance server 600 provides, in coordination with management center 500, the insurance service relating to the damage to the power storage leased by the lease service.

In the lease service, a plurality of lease types including a partial lease type and a full lease type are adopted. The partial lease type refers to a lease type for lease only of a power storage for a vehicle. A user who leases the power storage in accordance with the partial lease type prepares by the user himself/herself, a portion (body portion) of the vehicle except for the power storage. The user can mount the power storage leased from the leasing company on the body owned by the user himself/herself. As the power storage is mounted on the body, the xEV can travel.

When a partial lease contract is terminated, the user returns only the power storage to the leasing company. The full lease type, on the other hand, refers to a lease type for lease of the entire vehicle (that is, both of a body portion and a power storage). When a full lease contract is terminated, the user returns not only the power storage but also the entire vehicle to the leasing company.

Dealer 100 includes a server 150. The automaker sells or leases a vehicle through dealer 100. Dealer 100 not only sells vehicles manufactured by the automaker but also provides the lease service described previously. Server 150 manages information (vehicle information) on the vehicle sold or leased by dealer 100 as being distinguished based on a vehicle ID. Server 150 then transmits latest vehicle information to management center 500 in response to a request from management center 500 or each time the vehicle information is updated. Dealer 100 leases at least one of the body and the power storage provided by the automaker. Dealer 100 may lease a power storage 12A of a vehicle 10A shown in FIG. 1 to a user, for example, in accordance with the partial lease type. In this case, vehicle 10A corresponds to a partial lease vehicle (which may be denoted as a "vehicle A" below) and a body 11A of vehicle 10A is a property of the user. Power storage 12A of vehicle 10A is provided to the user by lease and it is a property of the automaker. Alternatively, dealer 100 may lease a vehicle 10B shown in FIG. 1 to a user, for example, in accordance with the full lease type. In this case, vehicle 10B corresponds to a full lease vehicle (which may be denoted as a "vehicle B" below). The entire vehicle 10B (a body 11B and a power storage 12B) is provided to the user by lease and it is a property of the automaker. Dealer 100 may sell, for example, a vehicle 10C shown in FIG. 1 to a user. In this case, vehicle 10C corresponds to a sold vehicle (which may be denoted as a "vehicle C" below). The entire vehicle 10C (a body 11C and a power storage 12C) is sold to the user and becomes a property of the user.

In this embodiment, a lease fee (for example, a monthly lease fee) charged by dealer 100 to a vehicle user includes an insurance fee. The vehicle leased by dealer 100 is covered by an insurance (more specifically, an insurance relating to a damage to the power storage) provided by insurance server 600. Specifically, a damage to the power storage mounted on each of vehicles A and B is covered by the insurance. The insurance service compensates for the damage to the power storage. Since the insurance is directed to the lease, vehicle C does not buy such an insurance. Vehicle C may buy another insurance.

BSta 200 is configured to replace the power storage for the vehicle (for example, for the xEV). BSta 200 includes a server 250. In this embodiment, a battery (more specifically, a secondary battery) is adopted as the power storage. The power storage should only be an apparatus where electric power can be stored, and examples of the power storage include a large-capacity capacitor other than the secondary battery.

The power storage management system according to this embodiment includes a plurality of BSta's 200. These BSta's 200 are provided at bases in an area (management area) managed by the management system so as to construct a network of battery replacement bases that covers the entire management area. Each BSta 200 may function as a vehicle repair garage. Each BSta 200 may be configured to repair the body. Though FIG. 1 shows only a single dealer 100, the management system may include a plurality of dealers 100. These dealers 100 may be provided at bases in the management area so as to construct a network of sales/lease bases that covers the entire area managed by the management system. Dealer 100 and BSta 200 may be provided at the same location (or in the vicinity).

Management center 500 includes a processor 510, a storage 520, and a communication module 530. Insurance server 600 includes a processor 610, a storage 620, and a communication module 630. Each of processors 510 and 610 includes, for example, a central processing unit (CPU). Each of storages 520 and 620 is configured such that information put thereinto can be stored therein. Each of storages 520 and 620 may include a hard disk (HD) drive or a solid state drive (SSD). Each of communication modules 530 and 630 is connected to a communication network NW, for example, through a wire. Each of servers 150 and 250 is also connected to communication network NW, for example, through a wire. Management center 500, insurance server 600, server 150, and server 250 are configured to communicate with one another over communication network NW. Communication network NW is a wide range network constructed, for example, of the Internet and a wireless base station. Communication network NW may include a cellular network.

Figure 2:
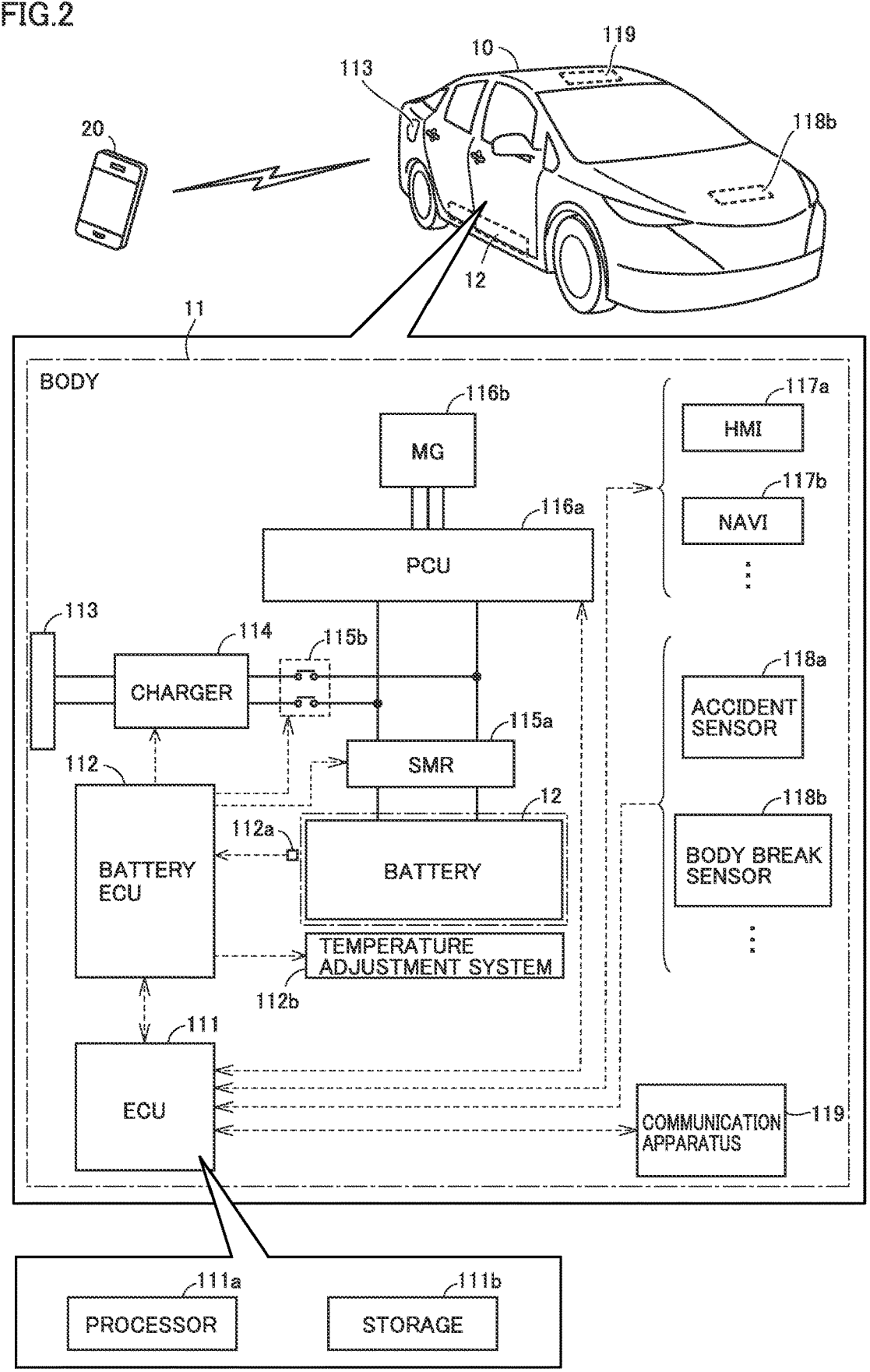
FIG. 2 is a diagram for illustrating a configuration of a vehicle shown in FIG. 1.

A vehicle provided by dealer 100 may be referred to as a "vehicle 10" below. Vehicle 10 according to this embodiment is one of vehicles A, B, and C shown in FIG. 1. FIG. 2 is a diagram for illustrating a configuration of vehicle 10.

Referring to FIG. 2, vehicle 10 includes body 11 and a battery 12 mounted on body 11. Vehicle 10 is configured to travel with electric power in battery 12. Vehicle 10 is, for example, a BEV without including an internal combustion engine. A known power storage for a vehicle (for example, a liquid secondary battery or an all-solid-state secondary battery) can be adopted as battery 12. Examples of the secondary battery for the vehicle include a lithium ion battery and a nickel metal hydride battery. A plurality of secondary batteries may form a battery assembly. Battery 12 corresponds to an exemplary "power storage" according to the present disclosure.

Body 11 includes an ECU 111, a battery ECU 112, a battery management system (BMS) 112a, a temperature adjustment system 112b, an inlet 113, a charger 114, a system main relay (SMR) 115a, a charging relay 115b, a power control unit (PCU) 116a, a motor generator (MG) 116b, a human machine interface (HMI) 117a, a navigation system (which is denoted as "NAVI" below) 117b, an accident sensor 118a, a body break sensor 118b, and a communication apparatus 119. The ECU stands for an electronic control unit. A control system including each ECU mounted on body 11 is supplied with electric power from a not-shown auxiliary battery.

ECU 111 is a computer including a processor 111a and a storage 111b. Not only a program to be executed by processor 111a but also information (for example, a map, a mathematical expression, and various parameters) used in the program are stored in storage 111b. Various types of information on vehicle 10 are further held in storage 111b. Such information is updated in accordance with a status of vehicle 10. Though FIG. 2 does not show a configuration of battery ECU 112, battery ECU 112 is also a computer similar in hardware configuration to ECU 111. ECU 111 and battery ECU 112 are configured to communicate with each other. These ECUs are connected to each other, for example, over controller area network (CAN).

Battery management system (BMS) 112a includes a sensor that detects a state (for example, a temperature, a current, and a voltage) of battery 12. A result of detection by BMS 112a is outputted to battery ECU 112. Temperature adjustment system 112b adjusts a temperature of battery 12. Temperature adjustment system 112b may include at least one of a heater and a cooling apparatus. Cooling may be water cooling. Temperature adjustment system 112b is controlled by battery ECU 112.

Vehicle 10 is configured as being externally chargeable (charging of battery 12 with electric power from the outside of the vehicle). Inlet 113 is constructed such that a plug (for example, a connector of a charging cable) of electric vehicle supply equipment (EVSE) is attachable thereto and removable therefrom. Charger 114 includes a power conversion circuit for external charging. Charger 114 may include at least one of a direct-current (DC)/DC conversion circuit and an alternating-current (AC)/DC conversion circuit. Charging relay 115b switches between connection and disconnection of a charging line. In the example shown in FIG. 2, the charging line including inlet 113, charger 114, and charging relay 115b is connected between SMR 115a and PCU 116a. Without being limited as such, the charging line may be connected between battery 12 and SMR 115a. The configuration shown in FIG. 2 may be modified to carry out external power feed (power feed from battery 12 to the outside of the vehicle). For example, charger 114 shown in FIG. 2 may be changed to a charger-discharger.

SMR 115a switches between connection and disconnection of an electrical path from battery 12 to PCU 116a. While vehicle 10 travels, SMR 115a is connected and charging relay 115b is disconnected. When electric power is exchanged between battery 12 and inlet 113, both of SMR 115a and charging relay 115b are connected. Each of charger 114, SMR 115a, and charging relay 115b is controlled by battery ECU 112. Battery ECU 112 receives a control command from ECU 111.

PCU 116a drives MG 116b with electric power supplied from battery 12. PCU 116a includes, for example, an inverter and a DC/DC converter. PCU 116a is controlled by ECU 111. MG 116b functions as a motor for travel of vehicle 10. MG 116b is driven by PCU 116a and rotates a drive wheel of vehicle 10. MG 116b carries out regeneration and outputs generated electric power to battery 12. Vehicle 10 may include any number of motors for travel.

HMI 117a includes an input device and a display device. HMI 117a may include a touch panel display. HMI 117a may include a meter panel and/or a head-up display. HMI 117a may include a smart speaker that accepts an audio input.

NAVI 117b includes a touch panel display, a global positioning system (GPS) sensor, a processor, and a storage where map information is stored. The map information indicates a position of each dealer 100 and a position of each BSta 200. The map information may sequentially be updated by over the air (OTA). The GPS sensor functions as a position sensor and detects a position of vehicle 10. NAVI 117b detects a position of vehicle 10 with the GPS sensor, and shows the position of vehicle 10 in real time on the map based on the map information. NAVI 117b searches for a route for finding an optimal route (for example, a shortest route) from the current position to a destination of vehicle 10 by referring to the map information.

When accident sensor 118a senses an accident of vehicle 10, it outputs an accident sensing signal to ECU 111. Examples of the accident include such a traffic accident (an accident causing a property damage) that traveling vehicle 10 collides against another vehicle or an obstacle. When vehicle 10 is involved in an accident, an acceleration of vehicle 10 abruptly changes. In this embodiment, when an acceleration sensor mounted on vehicle 10 detects an acceleration equal to or higher than a prescribed value, it outputs the accident sensing signal to ECU 111. Accident sensor 118a may use a drive recorder (not shown) mounted on vehicle 10 for accident sensing. For example, an accident of vehicle 10 may be sensed when an acceleration sensor (G sensor) of the drive recorder detects the acceleration equal to higher than the prescribed value.

An accident may be sensed in any manner, without being limited as above. For example, with an impactive force sensor, accident sensor 118a may output the accident sensing signal to ECU 111 when impactive force equal to or more than a prescribed value is applied to vehicle 10. Alternatively, accident sensor 118a may sense an accident of vehicle 10 based on video images of surroundings of vehicle 10 recorded by the drive recorder (for example, video images from a camera that shoots images of the surroundings of vehicle 10). Accident sensor 118a may include an image processing circuit for accident sensing. Accident sensor 118a may analyze acceleration data of vehicle 10 and determine whether or not vehicle 10 has been involved in an accident based on a result of analysis.

When body break sensor 118b senses break of body 11 (for example, a body shell), it outputs a body break signal to ECU 111. When body break sensor 118b according to this embodiment senses that body 11 is damaged to such an extent that vehicle 10 is unable to continue traveling, it outputs to ECU 111, a body break signal indicating break of body 11. In this embodiment, when body break sensor 118b detects wire break of a body wire (a wire connected to body 11) with a wire break detection circuit provided in a front portion of body 11, it outputs the body break signal to ECU 111.

Break of the body may be sensed in any manner, without being limited as above. For example, body break sensor 118b may output the body break signal to ECU 111 when it detects an amount of deformation (an amount of strain) equal to or larger than a prescribed value with the use of a strain gauge provided in the front portion of body 11. The prescribed value is set, for example, to a value at which vehicle 10 is unable to continue traveling. Each of the strain gauge and the wire break detection circuit for body break sensing may be provided in at least one of a side portion (opposing side portions) and a rear portion of body 11 in addition to or instead of the front portion of body 11.

Communication apparatus 119 includes a communication interface (I/F) for access to communication network NW through wireless communication. Communication apparatus 119 may include a telematics control unit (TCU) or a data communication module (DCM) for wireless communication. Communication apparatus 119 further includes a communication I/F for wireless communication with each of server 250 (FIG. 1) and portable terminal 20. ECU 111 is configured to communicate with each of management center 500 (FIG. 1), server 250, and portable terminal 20 through communication apparatus 119. ECU 111 may communicate with each of server 150 and insurance server 600 (FIG. 1) through communication apparatus 119.

Portable terminal 20 is configured as being portable by the user. Portable terminal 20 is operated while it is carried by the user (vehicle manager) of vehicle 10. In this embodiment, a smartphone equipped with a touch panel display is adopted as portable terminal 20. The smartphone contains a computer and performs a speaker function. Without being limited as such, any terminal portable by the user of vehicle 10 can be adopted as portable terminal 20. For example, a laptop computer, a tablet terminal, a portable game console, a wearable device (a smartwatch, smartglasses, smart gloves, or the like), and an electronic key can also be adopted as portable terminal 20. In this embodiment, each of HMI 117a, NAVI 117b, and portable terminal 20 can function as a user terminal of the subject vehicle.

Application software (which is referred to as a "mobile app" below) for using a service provided by management center 500 is installed in portable terminal 20. With the mobile app, identification information (a terminal ID) of portable terminal 20 is registered in management center 500 in association with identification information (a vehicle ID) of corresponding vehicle 10. Portable terminal 20 can exchange information with management center 500 through the mobile app. Portable terminal 20 may be configured to communicate with each of insurance server 600, server 250, and server 150 (FIG. 1).

In vehicle 10, ECU 111 carries out integrated control of the entire vehicle. ECU 111 obtains results of detection from various sensors (including accident sensor 118a and body break sensor 118b) mounted on vehicle 10. ECU 111 obtains information also from each of battery ECU 112, HMI 117a, NAVI 117b, and communication apparatus 119. Battery ECU 112 obtains a state (for example, a temperature, a current, a voltage, an SOC, and an SOH) of battery 12 based on an output from BMS 112a and outputs the obtained state of battery 12 to ECU 111. Vehicle information obtained by ECU 111 is stored in storage 111b. Vehicle 10 transmits the latest vehicle information to management center 500 together with the vehicle ID of the vehicle itself in response to a request from management center 500 or each time the vehicle information is updated. The vehicle ID may be a vehicle identification number (VIN).

The vehicle information held in vehicle 10 (storage 111b) includes battery information which will be described below.

The battery information of vehicle 10 corresponds to information on battery 12 while it is mounted on vehicle 10. The battery information includes identification information (battery ID), owner information, specifications (for example, a capacity in an initial state, charging performance, and discharging performance), a state of charge (SOC), and a state of health (SOH).

The owner information in the battery information indicates a battery owner (that is, the owner of battery 12). More specifically, the owner information includes identification information and contact information of the battery owner. The identification information of the battery owner includes information (for example, a name, a corporate name, an identification number, an identification sign, or the like) for specifying the owner of battery 12. The contact information of the battery owner includes information (for example, a communication address of a terminal of the battery owner) for contacting the battery owner.

In this embodiment, when dealer 100 sells or leases vehicle 10, the dealer writes into each of a storage (not shown) of server 150 and storage 111b of vehicle 10, owner information (identification information and contact information of the battery owner) of battery 12 of vehicle 10. The owner information in accordance with a sales contract or a lease contract is thus written in each storage. Specifically, in each of vehicle A (partial lease vehicle) and vehicle B (full lease vehicle), the identification information of the battery owner indicates that the owner of battery 12 is the automaker and the contact information of the battery owner indicates a communication address of management center 500. Management center 500 corresponds to the terminal of the automaker (the owner of battery 12). For vehicle C (sold vehicle), the identification information of the battery owner indicates that the owner of battery 12 is the vehicle user and the contact information of the battery owner indicates a communication address of portable terminal 20.

The SOC represents a remaining amount of stored power, and corresponds to a ratio of a current amount of stored power to an amount of stored power in a fully charged state. The SOH represents a level of health or a degree of deterioration. Examples of the SOH include a capacity retention ratio and an internal resistance. A higher internal resistance of the power storage means a higher degree of deterioration of the power storage. A lower capacity retention ratio of the power storage means the higher degree of deterioration of the power storage. The capacity retention ratio of the power storage corresponds to a ratio of a current capacity of the power storage to the capacity of the power storage in the initial state (a state where the power storage is not deteriorated). The capacity of the power storage corresponds to the amount of stored power in the fully charged state.

Referring again to FIG. 1, the power storage management system according to this embodiment includes a plurality of dealers 100, a plurality of BSta's 200, and a plurality of vehicles 10. The management system further includes a plurality of portable terminals 20 carried by users of vehicles 10. Management center 500 is configured to communicate with each of server 150 of dealer 100 provided at each base and server 250 of the battery replacement station (BSta 200) provided at each base. Management center 500 is configured to communicate also with each vehicle 10 sold or leased by any dealer 100 and portable terminal 20 corresponding to each vehicle 10.

Identification information (vehicle ID) of each vehicle 10 sold or leased by dealer 100 at each base is registered in advance in management center 500. Information on each vehicle 10 (vehicle information) is stored in storage 520 of management center 500 as being distinguished based on the vehicle ID. A latest value of a parameter that changes over time in the vehicle information is sequentially transmitted from each vehicle 10 to management center 500, and transition of such a parameter value is recorded in management center 500. In order to lower a frequency of communication, each vehicle 10 may collectively transmit data (for example, each parameter value recorded in association with time) recorded during a certain period to management center 500 when that period elapses. Management center 500 obtains the battery information described previously from each vehicle 10.

The vehicle information held in management center 500 includes use form information and fee information which will be described below, in addition to the battery information described previously.

The use form information represents a form of use of vehicle 10. In this embodiment, the use form information represents the form of use of any of vehicle A (partial lease vehicle), vehicle B (full lease vehicle), and vehicle C (sold vehicle). For example, when dealer 100 sells or leases vehicle 10, it writes the use form information of vehicle 10 into a storage (not shown) of server 150. Server 150 then transmits to management center 500, the use form information together with the vehicle ID.

The fee information corresponds to information on a lease fee paid by a vehicle user to the leasing company (automaker). The lease fee corresponds to the fee paid by the user for leased use of the vehicle or the battery.

Figure 3:
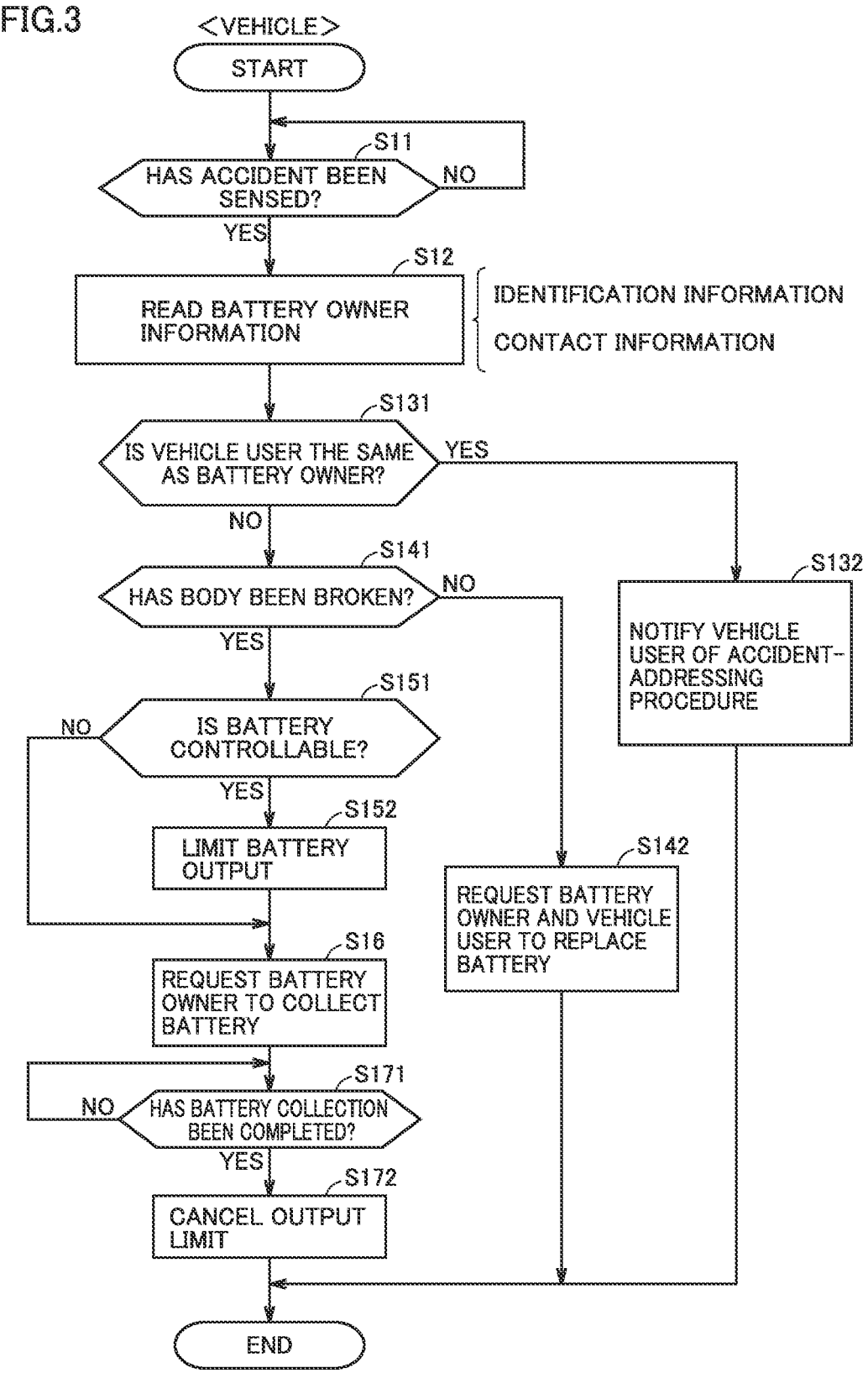
FIG. 3 is a flowchart showing control carried out by the vehicle on the occurrence of an accident in a method of managing a power storage according to the embodiment of the present disclosure.

FIG. 3 is a flowchart showing control carried out by vehicle 10 on the occurrence of an accident in a method of managing a power storage according to this embodiment. Each step in the flowchart is simply denoted as "S" below.

For example, when ECU 111 of vehicle 10 is started up, started-up ECU 111 starts a series of processing shown in FIG. 3 which will be described below. A control system (including ECU 111) of vehicle 10 is started up, for example, in response to an operation onto a start-up switch of vehicle 10. In general, the start-up switch is referred to as a "power switch," an "ignition switch," or the like. The series of processing shown in FIG. 3 is performed for any period. For example, ECU 111 may perform such processing only while vehicle 10 is traveling. Vehicle 10 that performs the series of processing shown in FIG. 3 is referred to as a "subject vehicle" below.

Referring to FIG. 3 together with FIGS. 1 and 2, in S11, ECU 111 of the subject vehicle determines whether or not the subject vehicle has been involved in an accident based on whether or not it has received the accident sensing signal from accident sensor 118*a*. In this embodiment, when the acceleration of the subject vehicle equal to or higher than a prescribed value is detected, ECU 111 determines that the subject vehicle has been involved in the accident. In this case (YES in S11), the process proceeds to S12. When the acceleration of the subject vehicle equal to or higher than the prescribed value is not detected, on the other hand, ECU 111 determines that the subject vehicle has not been involved in the accident. In this case (NO in S11), the process does not proceed to S12 or later and determination in S11 is repeated. An accident may be sensed in any manner, without being limited as above.

In S12, ECU 111 (more specifically, processor 111*a*) reads the owner information (including the identification information and the contact information of the battery owner) of battery 12 of the subject vehicle from storage 111*b*. In succession, in S131, ECU 111 determines whether or not the owner of battery 12 is the same as the user of the subject vehicle based on the read identification information of the battery owner. ECU 111 specifies the owner of battery 12 based on the identification information of the battery owner.

In this embodiment, when the subject vehicle falls under vehicle C, determination as YES is made in S131. Alternatively, when the subject vehicle falls under vehicle A or vehicle B, determination as NO is made in S131. When the subject vehicle falls under vehicle A or vehicle B, it includes the power storage leased by the automaker. In this case, the owner information stored in storage 111*b* indicates that the terminal of the owner of the power storage mounted on the subject vehicle is management center 500. Determination as NO in S131 in this embodiment means that the owner of battery 12 is the leasing company (automaker), that is, battery 12 mounted on the subject vehicle is provided by the lease service.

When the owner of battery 12 is the same as the user of the subject vehicle (YES in S131), in S132, ECU 111 gives the vehicle user, notification about post-accident handling. For example, ECU 111 controls the user terminal such that a prescribed procedure manual (for example, an accident-handling manual) is shown on the user terminal (for example, at least one of HMI 117*a* and portable terminal 20) of the subject vehicle. The user terminal may show a contact of an emergency vehicle (for example, at least one of an ambulance, a fire engine, a tow car, and a police vehicle) that deals with the accident.

When the owner of battery 12 is someone other than the user of the subject vehicle (NO in S131), in S141, ECU 111 determines whether or not body 11 of the subject vehicle has been broken based on whether or not ECU 111 has received the body break signal from body break sensor 118*b*. In this embodiment, ECU 111 determines that body 11 has been broken when wire break of the body wire (the wire connected to body 11) of the subject vehicle is detected. Detection of wire break of the body wire of the subject vehicle means that body 11 is damaged to such an extent that the subject vehicle is unable to continue traveling. In this case (YES in S141), the process proceeds to S151. When wire break of the body wire of the subject vehicle is not detected, on the other hand, ECU 111 determines that body 111 has not been broken (and that the subject vehicle is able to continue traveling). In this case (NO in S141), the process proceeds to S142. Break of the body may be sensed in any manner, without being limited as above.

In S142, ECU 111 requests each of the user terminal (for example, NAVI 117*b*) of the subject vehicle and management center 500 to replace battery 12 mounted on the subject vehicle. Specifically, ECU 111 specifies the communication address of management center 500 (the terminal of the battery owner) based on the contact information of the battery owner (S12) to notify the management center of occurrence of the accident of the subject vehicle and transmits to management center 500, a signal (which is referred to as a "replacement request signal" below) that requests permission of replacement of battery 12 at closest BSta 200. The replacement request signal according to this embodiment includes identification information of the vehicle (the vehicle ID of the subject vehicle) involved in the accident and position information on a location of occurrence of the accident. For example, the GPS sensor of NAVI 117*b* detects a position of a location of occurrence of the accident. ECU 111 may request deployment of an emergency vehicle that deals with the accident, as necessary.

When ECU 111 requests replacement of battery 12, NAVI 117*b* searches for a route with BSta 200 closest to the subject vehicle being set as the destination, and shows the route from the current position to the destination of the subject vehicle. Furthermore, NAVI 117*b* shows a message that encourages replacement of battery 12 to the user.

In S151, ECU 111 determines whether or not battery 12 is in a controllable state in the subject vehicle, body 11 of which has been broken. Specifically, ECU 111 determines, in cooperation with battery ECU 112, whether or not battery 12 is in the controllable state. Battery ECU 112 may determine whether or not battery 12 is in the controllable state based on whether or not a detection signal from BMS 112*a* is normal and whether or not response by a battery control component to a control command is normal. ECU 111 instructs battery ECU 112 to make the determination, and when battery ECU 112 determines that battery 12 is in the controllable state, ECU 111 makes determination as YES in S151. The process thus proceeds to S152. Any method of diagnosing the state of battery 12 is applicable, without being limited as above.

In S152, ECU 111 sets an output limit of battery 12 in battery ECU 112. In this embodiment, battery ECU 112 in which the output limit of battery 12 has been set (that is, battery ECU 112 in an output-limited state) instructs ECU 111 to lower output of battery 12 when discharging power of battery 12 exceeds a prescribed value (which is denoted as a "limit value U" below). Limit value U is set, for example, to a value around which electrically powered traveling other than limp home traveling is prohibited. When ECU 111 is instructed by battery ECU 112 to lower the output of battery 12, it lowers discharging power of battery 12. Therefore, while battery ECU 112 is in the output-limited state, control of PCU 116a by ECU 111 (and electrically powered traveling of the subject vehicle) is limited. Output limit control is not limited to the manner above. For example, while output from battery 12 is limited, SMR 115a may be maintained in a disconnected state.

While battery 12 is in the controllable state (YES in S151), the process proceeds to S16 after S152 is performed. In this case, output from battery 12 is limited in the processing described above (S152). When battery 12 is not in the controllable state (NO in S151), on the other hand, the process proceeds to S16 without the processing in S152 being performed. In this case, battery 12 is in an uncontrollable state.

In S16, ECU 111 requests management center 500 to collect battery 12 mounted on the subject vehicle. Specifically, ECU 111 specifies the communication address of management center 500 (the terminal of the battery owner) based on the contact information of the battery owner (S12) to notify the management center of occurrence of the accident of the subject vehicle and transmits to management center 500, a signal that requests collection (which is referred to as a "collection request signal" below) of battery 12 from the subject vehicle. The collection request signal according to this embodiment includes the identification information (the vehicle ID of the subject vehicle) of the vehicle involved in the accident and the position information of the location of occurrence of the accident. For example, the GPS sensor of NAVI 117b detects the position of the location of occurrence of the accident. ECU 111 may request deployment of an emergency vehicle that deals with the accident, as necessary.

As set forth above, when ECU 111 according to this embodiment senses break of body 11 on which battery 12 leased by the lease service is mounted and it is determined that battery 12 is in the controllable state, ECU 111 sets the output limit of battery 12 in vehicle 10 and transmits the collection request signal to management center 500 (S152 and S16). According to ECU 111 configured as such, management center 500 that provides the lease service can be requested to collect battery 12 when body 11 is broken.

After ECU 111 transmits the collection request signal, in S171, ECU 111 determines whether or not the battery owner has collected battery 12 from the subject vehicle. Specifically, ECU 111 determines whether or not it has received a collection completion signal (S25 in FIG. 4) which will be described later. While ECU 111 does not receive the collection completion signal (NO in S171), determination in S171 is repeated. When ECU 111 receives the collection completion signal (YES in S171), in S172, ECU 111 cancels the output limit (S152) set in the subject vehicle (more specifically, battery ECU 112). Since processing in S172 does not have to be performed while battery 12 is in the uncontrollable state, it may be skipped.

As set forth above, the method of managing the power storage according to this embodiment includes the series of processing shown in FIG. 3. In S11, whether or not the subject vehicle has been involved in an accident is determined. When it is determined that the subject vehicle including the leased power storage (battery 12) has been involved in the accident, in S141, whether or not body 11 of the subject vehicle has been broken is determined. When break of body 11 to such an extent that the subject vehicle is unable to continue traveling is sensed, in S151, whether or not the power storage is in the controllable state is determined. When it is determined that the power storage is in the controllable state, in S152, the output limit of the power storage is set in the subject vehicle. When break of body 11 is sensed, in S16, the collection request signal that requests collection of the power storage from the subject vehicle is transmitted to management center 500 (the terminal of the owner of the power storage). When the power storage is collected by the automaker (the owner of the power storage) from the subject vehicle in which the output limit has been set, in S172, the output limit set in the subject vehicle is canceled. When it is determined that the subject vehicle has been involved in the accident and that body 11 has not been broken, in S142, the replacement request signal that requests permission of replacement of the power storage mounted on the subject vehicle is transmitted to management center 500.

In the method, when the subject vehicle is unable to continue traveling, the collection request signal is transmitted to the terminal of the owner of the power storage. Collection of the power storage from the subject vehicle by the owner of the power storage is thus facilitated. When the power storage is in the controllable state, the output limit of the power storage is set in the subject vehicle. Therefore, unauthorized use of the subject vehicle with another power storage being mounted on repaired body 11 before collection of the power storage by the owner of the power storage is suppressed. Since the output limit of the power storage is canceled after collection of the power storage by the owner of the power storage, the user of the subject vehicle can use the subject vehicle with another power storage being mounted on repaired body 11. When the subject vehicle is able to continue traveling, the subject vehicle can continue traveling to the location of replacement of the power storage and can have the power storage replaced. The owner of the power storage can collect the power storage from the subject vehicle by permitting replacement of the power storage at a prescribed location (for example, closest BSta 200).

When processing in one of S132, S142, and S172 is performed, post-accident control shown in FIG. 3 ends. When the owner of battery 12 mounted on the subject vehicle is someone other than the user of the subject vehicle, the replacement request signal (S142) or the collection request signal (S16) is transmitted from the subject vehicle to management center 500. Each of the replacement request signal and the collection request signal corresponds to the notification of occurrence of the accident. When management center 500 receives the notification of occurrence of the accident from the subject vehicle, it starts a series of processing shown in FIG. 4 which will be described below. When the owner of battery 12 mounted on the subject vehicle is the same as the user of the subject vehicle, on the other hand, the notification of occurrence of the accident is not given to management center 500. In this case, the series of processing shown in FIG. 4 is not performed.

Figure 4:
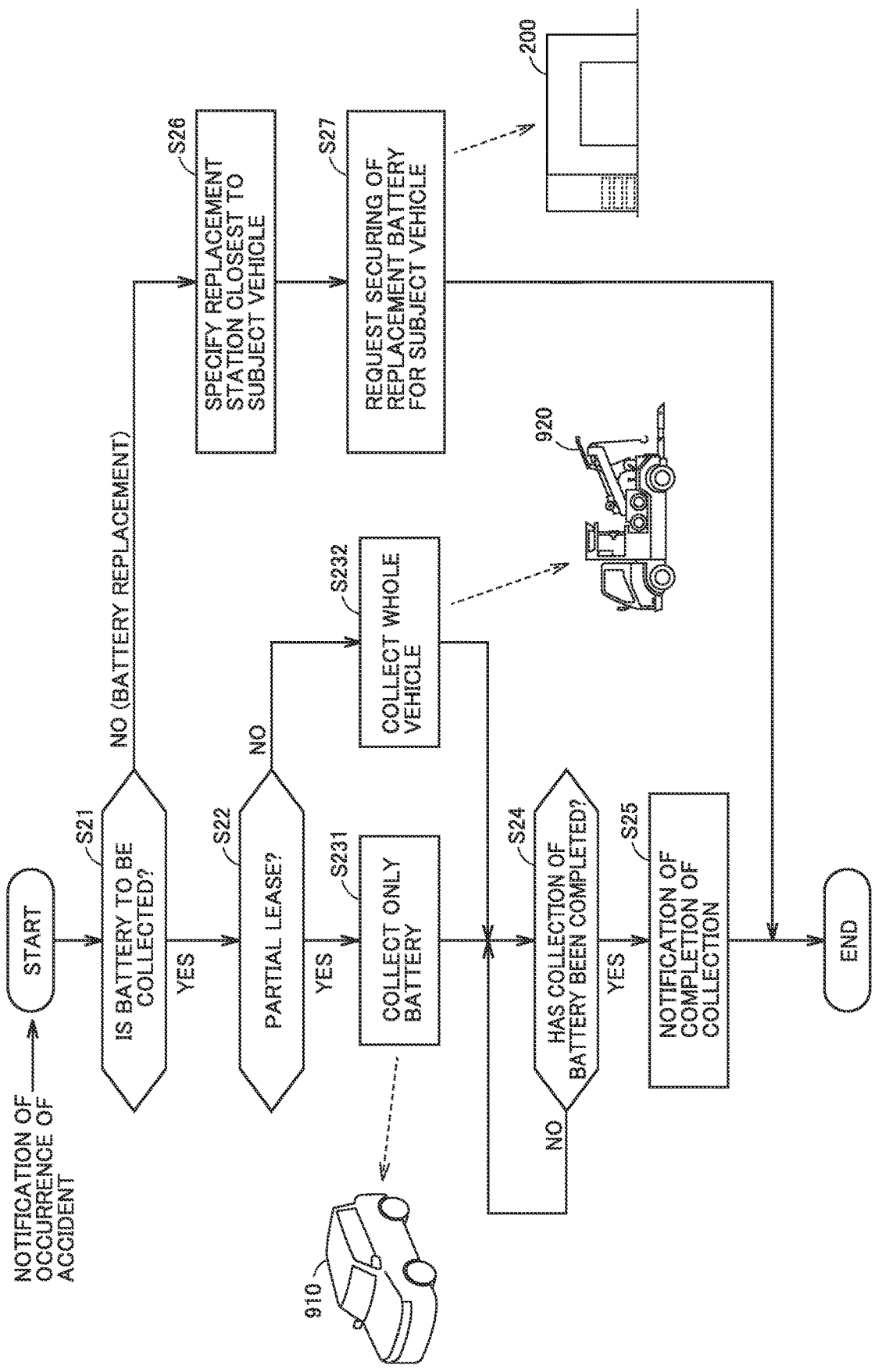
FIG. 4 is a flowchart showing control carried out by a server (a terminal of an owner of the power storage) on the occurrence of an accident in the method of managing a power storage according to the embodiment of the present disclosure.

FIG. 4 is a flowchart showing control carried out by management center 500 on the occurrence of an accident in the method of managing a power storage according to this embodiment.

Referring to FIG. 4 together with FIGS. 1 and 2, in S21, management center 500 determines whether or not to collect battery 12 mounted on the subject vehicle. Specifically, when management center 500 receives the collection request signal (S16 in FIG. 3) from the subject vehicle, it determines to collect battery 12, and when it receives the replacement request signal (S142 in FIG. 3) from the subject vehicle, it determines not to collect battery 12.

When it is determined to collect battery 12 (YES in S21), in S22, management center 500 determines whether or not the subject vehicle falls under the partial lease vehicle. Specifically, management center 500 obtains the use form information of the subject vehicle based on the identification information (vehicle ID) of the subject vehicle included in the collection request signal, and determines under which of vehicle A and vehicle B the subject vehicle falls based on the use form information. When the subject vehicle falls under vehicle A (YES in S22), in S231, management center 500 requests a collection vehicle 910 to collect battery 12 alone (battery 12 detached from the subject vehicle). When the subject vehicle falls under vehicle B (NO in S22), in S232, management center 500 requests a tow car 920 to collect the whole subject vehicle (that is, collection of body 11 and battery 12 together, without detachment of battery 12 from the subject vehicle).

In following S24, management center 500 determines whether or not collection vehicle 910 or tow car 920 has completed collection of battery 12 in response to the request in S231 or S232. Determination in S24 is repeatedly made until collection of battery 12 is completed.

When each of collection vehicle 910 and tow car 920 according to this embodiment receives a collection request from management center 500 (for example, receives a request signal indicating the position of the location of the occurrence of the accident), it goes to a location where the subject vehicle came to a standstill (the location of occurrence of the accident). Collection vehicle 910 notifies management center 500 of completion of collection when it secures battery 12 detached from the subject vehicle (for example, when battery 12 is loaded on collection vehicle 910). Tow car 920 notifies management center 500 of completion of collection when it secures the subject vehicle (for example, when the subject vehicle is fixed to tow car 920). Each of collection vehicle 910 and tow car 920 may transport collected battery 12 (battery 12 alone or the subject vehicle) to BSta 200.

When management center 500 receives the notification of completion of collection, it determines that collection of battery 12 has been completed (YES in S24). The process thus proceeds to S25. In S25, management center 500 transmits to the subject vehicle, the collection completion signal indicating collection of battery 12 from the subject vehicle by the battery owner (automaker). When the processing in S25 is performed, the series of processing shown in FIG. 4 ends.

When it is determined to collect battery 12 in S21, battery 12 is collected from the subject vehicle as above. When it is determined not to collect battery 12 (NO in S21), on the other hand, management center 500 permits BSta 200 closest to the subject vehicle to replace the battery in processing in S26 and S27 which will be described below.

In S26, management center 500 specifies one BSta 200 closest to the position of the subject vehicle based on the position information included in the replacement request signal. In succession, in S27, management center 500 requests server 250 of BSta 200 specified in S26 to secure a power storage (replacement battery) that replaces battery 12 mounted on the subject vehicle. Specifically, management center 500 makes the request to server 250 by extracting information (for example, the battery ID and the specifications) on battery 12 of the subject vehicle from a database stored in storage 520 based on the identification information (vehicle ID) of the subject vehicle and transmitting a signal (which is also referred to as a "battery request signal" below) including the extracted battery information to server 250. Server 250 that has received this request determines whether or not inventory of replacement batteries requested by management center 500 is insufficient. When it is determined that the inventory of the replacement batteries is insufficient, server 250 requests a warehouse nearby or another BSta 200 to provide the replacement battery (the power storage for the subject vehicle). The replacement battery is thus secured at BSta 200 that has received the battery request signal from management center 500.

As set forth above, when management center 500 receives the replacement request signal from the subject vehicle, it requests a prescribed replacement station (for example, BSta 200 closest to the subject vehicle) to secure the power storage that replaces battery 12 (S27). According to such a configuration, when replacement of battery 12 mounted on the subject vehicle is necessitated, BSta 200 more readily prepares the power storage for replacement (that is, the power storage compatible with the power storage mounted on the subject vehicle) early.

In processing in S27, management center 500 permits BSta 200 that has received the battery request signal to replace the power storage (battery 12) of the subject vehicle. The battery ID included in the battery request signal is registered in server 250. Battery replacement is thus reserved in server 250. Server 250 specifies a battery to be replaced based on the battery ID included in the battery request signal. When the battery is not replaced even after lapse of a prescribed period since reservation of battery replacement, the reservation is canceled.

Figure 5:
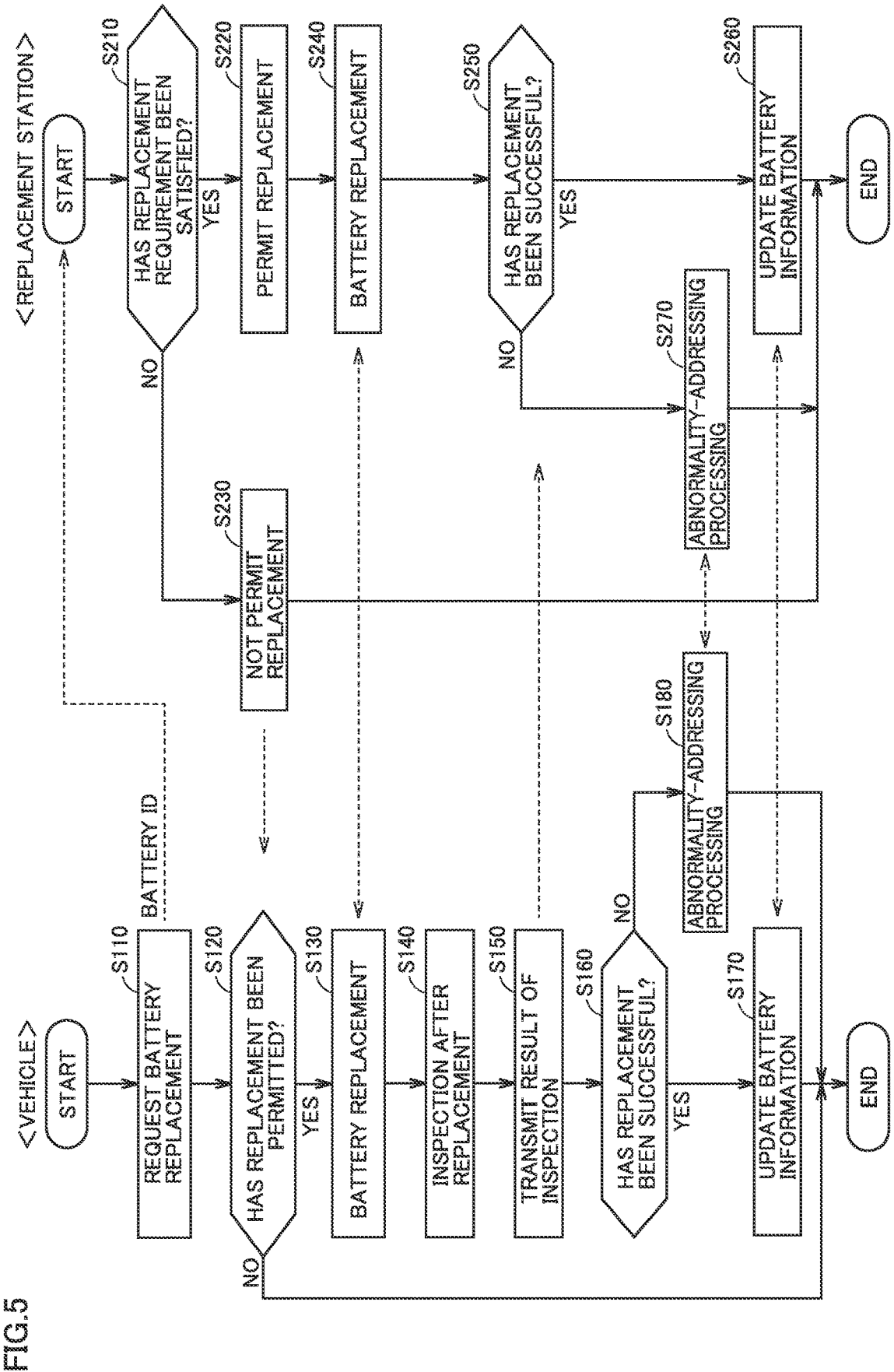
FIG. 5 is a flowchart showing processing involved with battery replacement performed by a vehicle and a replacement station terminal in the method of managing a power storage according to the embodiment of the present disclosure.

When the processing in S27 is performed, the series of processing shown in FIG. 4 ends. The user of the subject vehicle (the vehicle involved in the accident) that has transmitted the replacement request signal in S142 in FIG. 3 drives the subject vehicle in accordance with guidance (see S142 in FIG. 3) by NAVI 117b and arrives at BSta 200 closest to the accident site. Battery 12 mounted on the subject vehicle is then replaced at BSta 200. FIG. 5 is a flowchart showing processing involved with battery replacement performed by vehicle 10 and a battery replacement station terminal (server 250).

Referring to FIG. 5 together with FIGS. 1 and 2, a series of processing from S110 to S180 is performed by ECU 111 of the subject vehicle. A series of processing from S210 to S270 is performed by server 250. Server 250 is configured to wirelessly communicate with the subject vehicle and obtains battery information from the subject vehicle. Server 250 and the subject vehicle may establish short-range communication, for example, through a wireless local area network (LAN) or communicate over communication network NW.

After the subject vehicle arrives at BSta 200, in S110, it transmits a signal that asks for battery replacement (which is also referred to as an "asking signal" below) to server 250. Yet-to-be-replaced battery 12 included in the subject vehicle is denoted as a "battery B1" below. The asking signal includes identification information (battery ID) of battery B1 mounted on the subject vehicle. The subject vehicle may ask for battery replacement (S110) in accordance with an instruction from the user.

In S210, server 250 that has received the asking signal determines whether or not a prescribed replacement requirement is satisfied for the subject vehicle. Specifically, server 250 determines whether or not the replacement requirement is satisfied based on whether or not the battery ID received from the subject vehicle matches with the battery ID included in the battery request signal obtained from management center 500 (S27 in FIG. 4). In other words, when the battery ID of the subject vehicle has been registered (reserved), the replacement requirement is satisfied, and when the battery ID of the subject vehicle has not been registered (reserved), the replacement requirement is not satisfied.

When the replacement requirement is satisfied for the subject vehicle (YES in S210), in S220, server 250 sends a notification indicating permission to the subject vehicle and thereafter the process proceeds to S240. When the replacement requirement is not satisfied for the subject vehicle (NO in S210), on the other hand, in S230, server 250 transmits a notification indicating non-permission to the subject vehicle and thereafter the series of processing from S210 to S270 ends. In this case, the battery is not replaced.

After the subject vehicle transmits the asking signal (S110), it waits for a reply from server 250. When the subject vehicle then receives the reply from server 250, in S120, the subject vehicle determines whether or not battery replacement has been permitted. When the subject vehicle then receives the notification indicating permission (YES in S120), the process proceeds to S130. When the subject vehicle has received the notification indicating non-permission (NO in S120), on the other hand, the series of processing from S110 to S180 ends. In this case, the battery is not replaced.

In S130 and S240, the battery is replaced in a procedure which will be described later (see FIG. 6). The subject vehicle and server 250 may exchange information for battery replacement. Server 250 may obtain from the subject vehicle, information (for example, the specifications) on the battery mounted on the subject vehicle.

Battery 12 attached to the subject vehicle by battery replacement is denoted as a "battery B2" below. When replacement of the battery is completed, in S140, the subject vehicle inspects battery B2. In succession, in S150, the subject vehicle transmits a result of inspection to server 250. In succession, in S160, the subject vehicle determines whether or not the battery has successfully been replaced in accordance with the result of inspection. The subject vehicle determines that the battery has successfully been replaced unless abnormality (for example, defective connection or abnormal electrical performance) is found in the inspection, and determines that replacement of the battery has failed when abnormality is found in the inspection. Similarly, in S250, server 250 that has received the result of inspection also determines whether or not the battery has successfully been replaced in accordance with the result of inspection (normal/abnormal).

When the battery has successfully been replaced (YES in S160 and YES in S250), the subject vehicle and server 250 update the battery information held therein in S170 and S260, respectively, and thereafter the series of processing shown in FIG. 5 ends. When replacement of the battery has failed (NO in S160 and NO in S250), on the other hand, in S180 and S270, the subject vehicle and server 250 perform prescribed abnormality-addressing processing, respectively. The abnormality-addressing processing may include processing for notifying the user of the subject vehicle of failure in replacement of the battery. The abnormality-addressing processing may include processing for notifying management center 500 of failure in replacement of the battery. The abnormality-addressing processing may include processing for once detaching battery B2 attached to the subject vehicle from the subject vehicle and redoing replacement of the battery. After the abnormality-addressing processing is performed, the series of processing shown in FIG. 5 ends. The abnormality-addressing processing can freely be set.

FIG. 6 is a diagram for illustrating a configuration and an operation of the battery replacement station (BSta 200) according to this embodiment.

Referring to FIG. 6 together with FIGS. 1 and 2, BSta 200 includes a storage apparatus 210, an inspection portion 220, and server 250. Storage apparatus 210 includes an accommodation portion (for example, a storage). Inspection portion 220 includes, for example, a charger-discharger, a measurement apparatus, and a categorization apparatus. BSta 200 further includes a transport apparatus that transports the power storage and a replacement apparatus that replaces the power storage. A type of transport may be a conveyor type or a type with the use of a delivery robot. Each of the transport apparatus and the replacement apparatus is controlled by server 250.

Server 250 includes a processor 251, a storage 252, and a communication module 253. Information on each battery present in BSta 200 is stored in storage 252 as being distinguished based on the identification information (battery ID) of the battery. The battery information held in server 250 includes, for example, specifications (for example, a capacity in an initial state, charging performance, and discharging performance), status information indicating a status of inspection, the SOH, and the SOC. The status information may indicate, for example, any status of yet-to-be-inspected, inspected (reuse), inspected (another application), inspected (scrap), and suppliable. Server 250 sequentially transmits information held therein to management center 500. The battery present in BSta 200 is a property of the automaker. A new battery may be supplied from a warehouse of the automaker to BSta 200 or a secondhand battery collected from vehicle 10 may be stored at BSta 200. The battery may be transported between a plurality of BSta's 200.

The subject vehicle is parked at a prescribed position in BSta 200, and thereafter asks server 250 to replace the battery (S110 in FIG. 5). In response to this asking, server 250 starts control for battery replacement (S240 in FIG. 5). Server 250 has the battery of the subject vehicle replaced, for example, in a procedure as below.

Server 250 selects a battery (replacement battery) corresponding to battery B1 from among a plurality of batteries B3 accommodated in the accommodation portion of storage apparatus 210. Selected battery B3 is the same in specifications (for example, the capacity in the initial state, charging performance, and discharging performance) as battery B1. Battery B3, however, is lower in degree of deterioration than battery B1. The SOC of battery B3 is equal to or higher than a prescribed SOC value (for example, 50%).

In succession, the replacement apparatus detaches battery B1 from the subject vehicle. The battery detached from the subject vehicle is denoted as a "battery B4" below. In succession, the transport apparatus transports (supplies) battery B3 from storage apparatus 210 to the replacement apparatus. In succession, the replacement apparatus attaches supplied battery B3 to the subject vehicle. Battery replacement of the subject vehicle is thus completed.

BSta 200 performs a process for reuse of battery B4 detached from the subject vehicle, in parallel to the battery replacement process above. When battery B4 is detached from the subject vehicle, server 250 starts control for reuse of the battery. The reuse process is performed, for example, in a procedure as below.

The transport apparatus transports (collects) battery B4 to inspection portion 220. In succession, inspection portion 220 inspects collected battery B4. The charger-discharger and the measurement apparatus in inspection portion 220 conduct the inspection. Processing for recovery of the SOH may be performed on battery B4 before the inspection.

In the inspection, for example, the charger-discharger has battery B4 discharged until the SOC attains to a prescribed first SOC value (for example, the SOC value indicating an empty state) and thereafter it has battery B4 charged until the SOC attains to a prescribed second SOC value (for example, the SOC value indicating the fully charged state). The measurement apparatus includes various sensors, and measures a state (for example, a temperature, a current, and a voltage) of battery B4 during charging and/or discharging. The measurement apparatus then detects the SOH of battery B4 based on measurement data. The measurement apparatus may further include a camera for inspection of an appearance. The charger-discharger may repeat charging and discharging of battery B4 until the measurement apparatus obtains necessary inspection data.

When the inspection is completed, the categorization apparatus of inspection portion 220 categorizes battery B4 into a battery for reuse as a vehicle battery, a battery for use in another application (an application other than the application for the vehicle), and scrap, in accordance with a result of the inspection. Examples of other applications may include stationary use. The battery may be scrapped in any manner. In a process of scrap, the battery may be disassembled to a material level to collect a recyclable material (resource) for reuse of the material (resource recycle). The categorization apparatus may categorize battery B4 having a significantly damaged appearance into a non-reusable battery (another application or scrap).

Battery B4 which has been inspected (reuse) is handled as battery B3 described previously. After the inspection, the transport apparatus transports battery B3 to storage apparatus 210. Storage apparatus 210 is replenished with transported battery B3. Inspected and charged battery B3 is thus set in storage apparatus 210. Without being limited as such, storage apparatus 210 may be configured to charge inspected battery B3.

FIG. 6 shows an example where detachment of the battery and attachment of the battery are performed at different locations. The subject vehicle may be transported from a detachment position to an attachment position by a not-shown transport apparatus (for example, a transport apparatus of a conveyor type). Without being limited as such, detachment of the battery and attachment of the battery may be performed at the same location. The battery may be replaced (detached and attached) while the subject vehicle is at a standstill (for example, a parked state). The yet-to-be-replaced battery and the replaced battery do not essentially have to be the same in specifications. The vehicle-mounted battery may be replaced with a battery different in specifications. For example, the capacity of the vehicle-mounted battery may be increased as a result of battery replacement.

As described above, the method of managing the power storage according to this embodiment includes processing shown in FIGS. 3 to 5. In this embodiment, ECU 111 corresponds to the exemplary "computer apparatus" according to the present disclosure. The processing is performed by execution by at least one processor, of a program stored in at least one memory. The processing, however, may be performed by dedicated hardware (electronic circuitry) rather than software.

Vehicle 10 according to this embodiment includes body 11, battery 12 (power storage) mounted on body 11, a sensor (body break sensor 118b) that senses break of body 11, ECU 111 (first controller) that performs the management method (for example, processing shown in FIG. 3) described above for battery 12, and battery ECU 112 (second controller) that controls battery 12. When it is determined that body 11 has been broken, battery ECU 112 determines whether or not battery 12 is in the controllable state (S151 in FIG. 3). When it is determined that battery 12 is in the controllable state, ECU 111 sets the output limit of battery 12 in battery ECU 112 (S152 in FIG. 3). According to vehicle 10 thus configured, collection of the power storage from vehicle 10 by the owner of the leased power storage in the event of break of body 11 of vehicle 10 including the power storage is facilitated.

The series of processing shown in FIG. 4 may be performed by server 150 (dealer terminal) instead of management center 500. Processing flows shown in FIGS. 3 to 5 can be modified as appropriate. For example, depending on an object, the order of processing may be changed or an unnecessary step may be omitted. Contents in any processing may be modified.

In this embodiment, management center 500, insurance server 600, server 150, and server 250 are each an on-premise server. Without being limited as such, the function of each server may be implemented on the cloud by cloud computing. In other words, these servers may be cloud servers. A location where the lease service is provided is not limited to dealer 100. For example, management center 500 may provide the lease service on-line (for example, on the cloud). Only a single lease type (for example, the partial lease type) may be provided.

Though only the battery is replaced in the embodiment, a battery pack including a battery and accessories thereof (for example, a battery ECU, a BMS, a temperature adjustment system, and an SMR) altogether may be replaced. While the output is limited, the battery ECU may maintain the SMR in the disconnected state. When the output limit is canceled, the battery ECU may set the SMR to the connected state.

The vehicle may be an xEV (electrically powered vehicle) other than the BEV. The vehicle may include an internal combustion engine (for example, a gasoline engine, a bio-fuel engine, or a hydrogen engine). The vehicle is not limited to a four-wheel passenger car, but may be a bus or a truck, or an xEV (electrically powered vehicle) with three wheels or at least five wheels. The vehicle may be provided with a solar panel. The vehicle may be configured to wirelessly be chargeable. The vehicle may be configured to be able to autonomous drive or may perform a flying function. The vehicle may be a vehicle (for example, a robo-taxi, an automated guided vehicle, or an agricultural machine) that can travel without human intervention.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A method of managing a power storage comprising:
   determining whether a vehicle has been involved in an accident based on whether an acceleration of the vehicle equal to or higher than a prescribed value is detected, the vehicle including a body and a power storage;
   in response to determining that the vehicle has been involved in the accident, determining whether the body has been broken based on whether a wire break of a wire connected to the body is detected;
   in response to determining that the body has been broken, determining whether the power storage is in a controllable state;
   in response to determining that the vehicle has been involved in the accident, the body has been broken, and the power storage is in a controllable state, setting an output limit of the power storage in the vehicle, and transmitting to a terminal of an owner of the power storage, a collection request signal that requests collection of the power storage from the vehicle; and
   in response to determining that the vehicle has been involved in the accident and the body has not been broken, transmitting a replacement request signal that requests permission of replacement of the power storage mounted on the vehicle to the terminal of the owner of the power storage.

2. The method of managing a power storage according to claim 1, further comprising:
   after transmitting the collection request signal, monitoring whether the owner of the power storage has collected the power storage from the vehicle; and
   canceling the output limit set in the vehicle when the power storage is collected by the owner of the power storage from the vehicle in which the output limit is set.

3. A computer apparatus comprising:
   a processor; and
   a storage where a program causing the processor to perform the method of managing a power storage according to claim 1 is stored.

4. A power storage management system comprising:
   the vehicle including the computer apparatus according to claim 3; and
   a server that provides a lease service for lease of a power storage to the vehicle, wherein
   the storage of the computer apparatus further stores owner information indicating that the terminal of the owner of the power storage mounted on the vehicle is the server, and
   the computer apparatus is configured to set an output limit of the power storage in the vehicle and to transmit the collection request signal to the server when break of the body is sensed and it is determined that the power storage is in the controllable state.

5. The power storage management system according to claim 4, further comprising a plurality of replacement stations where the power storage for the vehicle is replaced, wherein
   the computer apparatus is configured to transmit to the server in response to determining that the vehicle has been involved in the accident and the body has not been broken, the replacement request signal, and
   when the server receives the replacement request signal, the server requests a replacement station to secure a power storage that replaces the power storage mounted on the vehicle.

6. The power storage management system according to claim 4, wherein
   the server is configured to
      obtain use form information of the vehicle in response to the server receiving the collection request signal, the use form information indicating a form of use of the vehicle falling under one of a partial lease vehicle, a full lease vehicle, and a sold vehicle, the partial lease vehicle including a body owned by a user and a power storage provided to the user by lease, the full lease vehicle including a body and a power storage provided to a user by lease, the sold vehicle including a body and a power storage owned by a user,
      in response to determining that the vehicle falls under the partial lease vehicle based on the use form information, request a first vehicle to collect the power storage detached from the vehicle, and
      in response to determining that the vehicle falls under the full lease vehicle based on the use form information, request a second vehicle to collect the body and the power storage of the vehicle together without detachment of the power storage from the vehicle.

7. The power storage management system according to claim 4, further comprising a plurality of replacement stations where a power storage for a vehicle is replaced, wherein
   the computer apparatus is configured to, in response to determining that the vehicle has been involved in the accident and the body has not been broken, transmit the replacement request signal to the server,
   the server is configured to, in response to the server receiving the replacement request signal, transmit a battery request signal to a replacement station closest to the vehicle of the plurality of replacement stations, the battery request signal including identification information of the power storage,
   in response to the replacement station receiving the battery request signal, the identification information included in the battery request signal is registered in the replacement station, and
   the replacement station is configured
      to determine, in response to the replacement station receiving an asking signal including identification information of the power storage from the vehicle, whether or not a replacement requirement is satisfied for the vehicle based on whether or not the identification information included in the asking signal is registered in the replacement station,
      to replace the power storage mounted on the vehicle when the replacement requirement is satisfied for the vehicle, and
      not to replace the power storage mounted on the vehicle when the replacement requirement is not satisfied for the vehicle.

8. The method of managing a power storage according to claim 1, further comprising:
   determining whether the power storage is in a controllable state based on whether a detection signal from a battery management system (BMS) is normal and whether a response by a control component of the power storage to a control command is normal, the BMS detecting a state of the power storage; and in response to determining that the vehicle has been involved in the accident, the body has been broken, and the power storage is not in a controllable state, transmitting the collection request signal to the terminal of the owner of the power storage without setting the output limit of the power storage in the vehicle.

9. A vehicle comprising:
a body;
a power storage mounted on the body;
a first sensor that senses that the vehicle has been involved in an accident;
a second sensor that senses that the body has had a break;
a first controller that manages the power storage; and
a second controller that controls the power storage, wherein
the first sensor is configured to output an accident sensing signal to the first controller in response to detecting an acceleration equal to or higher than a prescribed value by an acceleration sensor,
the second sensor is configured to output a body break signal to the first controller in response to detecting a wire break of a wire connected to the body by a wire break detection circuit provided in a front portion of the body,
the first controller is configured to
　determine that the vehicle has been involved in an accident based on the first controller receiving the accident sensing signal,
　in response to determining that the vehicle has been involved in the accident, determine that the body has been broken based upon the first controller receiving the body break signal,
the second controller is configured to determine whether the power storage is in a controllable state in response to determining, by the first controller, that the body has been broken, and
the first controller is configured to,
　based upon the determination that the vehicle has been involved in the accident, the body has been broken, and the power storage is in the controllable state, set an output limit of the power storage in the second controller, and transmit to a terminal of an owner of the power storage, a collection request signal that requests collection of the power storage from the vehicle, and
　based upon the determination that the vehicle has been involved in the accident and the body has not been broken, transmit a replacement request signal that requests permission of replacement of the power storage mounted on the vehicle to the terminal of the owner of the power storage.

10. The vehicle according to claim 9, further comprising a battery management system (BMS) configured to detect a state of the power storage and output a result of detection to the second controller, wherein the second controller is configured to determine whether or not the power storage is in a controllable state based on whether or not a detection signal from the BMS is normal and whether or not response by a control component of the power storage to a control command is normal, and
the first controller is configured to, in response to determining that the vehicle has been involved in the accident, the body has been broken, and the power storage is not in a controllable state, transmit the collection request signal to the terminal of the owner of the power storage without setting the output limit of the power storage in the vehicle.

11. The vehicle according to claim 9, wherein
the second controller is configured
　to perform output limit control when the output limit of the power storage is set in the vehicle,
　not to perform the output limit control when the output limit of the power storage is not set in the vehicle, and
in the output limit control, the second controller is configured to lower output of the power storage in response to discharging power of the power storage exceeding a prescribed power value.

12. The vehicle according to claim 11, wherein
the prescribed power value is set to a value around which electrically powered traveling other than limp home traveling of the vehicle is prohibited.

13. The vehicle according to claim 9, wherein
the first controller includes a storage where owner information indicating an owner of the power storage is stored,
the owner information includes identification information of the owner of the power storage, and
the first controller is configured to
　determine whether the owner of the power storage is identical to a user of the vehicle based on the identification information, and
　in response to determining that the vehicle has been involved in the accident, the body has not been broken, and the owner of the power storage is identical to the user of the vehicle, control a user terminal of the vehicle to give the user a notification about post-accident handling.

14. The vehicle according to claim 13, wherein
the owner information further includes contact information of the owner of the power storage, and
the first controller is configured to, in response to determining that the vehicle has been involved in the accident, the body has not been broken, and the owner of the power storage is not identical to the user of the vehicle, transmit the replacement request signal to a communication address specified based on the contact information.

* * * * *